(12) United States Patent
Schmidl

(10) Patent No.: US 6,385,633 B1
(45) Date of Patent: May 7, 2002

(54) METHOD AND APPARATUS FOR COMPUTING COMPLEX PHASE

(75) Inventor: Timothy M. Schmidl, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/343,421

(22) Filed: Jun. 30, 1999

Related U.S. Application Data

(60) Provisional application No. 60/091,216, filed on Jun. 30, 1998.

(51) Int. Cl.[7] ............................................. G06F 7/548
(52) U.S. Cl. ........................................ 708/441; 712/7
(58) Field of Search ............................... 708/441; 712/7

(56) References Cited

U.S. PATENT DOCUMENTS

| | | | |
|---|---|---|---|
| 3,917,935 A | * 11/1975 | Lazecki .................... 708/441 |
| 3,952,187 A | * 4/1976 | Robinson et al. ........... 708/441 |
| 3,976,869 A | * 8/1976 | Stella et al. ................ 708/441 |
| 4,231,102 A | * 10/1980 | Barr et al. .................. 708/441 |
| 4,587,552 A | * 5/1986 | Chin .......................... 708/441 |
| 4,692,889 A | * 9/1987 | McNeely .................... 708/441 |

* cited by examiner

Primary Examiner—David H. Malzahn
(74) Attorney, Agent, or Firm—Warren L. Franz; W. James Brady; Frederick J. Telecky, Jr.

(57) ABSTRACT

The phase of a complex number I+jQ is computed using a hybrid lookup table and computation approach suitable for DSP implementation and useful in remote access/networking and wireless applications. An approximate phase θ~ for an approximation complex number I~+jQ~ is determined through memory table lookup. This is added to a correction phase Δθ which is determined by calculation of a correction term C=(I~*Q−Q~*I)/(I*I~+Q*Q~) which represents the imaginary part divided by the real part of the complex multiplication of the complex number and the conjugate of the approximate complex number.

3 Claims, 2 Drawing Sheets

METHOD AND APPARATUS FOR COMPUTING COMPLEX PHASE

This application claims priority under 35 USC 119(e)(1) of provisional application No. 60/091,216 filed Jun. 30, 1998.

This invention relates generally to methods and apparatus for signal processing; and, in particular, to methods and apparatus for computing the phase of a complex number for remote access/networking and wireless communication applications.

BACKGROUND OF THE INVENTION

In some signal processing applications, it is necessary to be able to accurately compute the phase of a complex number. This is useful, for example, in modem data communications wherein phase angle is calculated for data encoded in IQ constellation format. This is also useful, for example, in automatic frequency control (AFC) for receivers of proposed wideband CDMA mobile communications systems which enable Internet access and video communications over wireless telephone installations. Here, phase corresponds to carrier frequency offset and phase must be accurately calculated in order to be able to closely track carrier frequency. This offset can be calculated from the argument of I+jQ, where I and Q are n-bit (viz. 20-bit) binary numbers. To meet system requirements, the argument must be calculated using a digital signal processor (DSP) to an accuracy of about 0.02 degrees.

Some prior art methods use a lookup table to find the arctangent. This does not lead to an accurate result unless very large lookup tables are used.

Another prior art method uses large tables of polynomial coefficients and reference values. Such approach is described in U.S. Pat. No. 5,648,924, issued Jul. 15, 1997, entitled "Method and Apparatus for Finding Arctangents," incorporated herein by reference.

Yet another approach is the CORDIC method which was developed for real-time high precision computations in the 1950's. Unified CORDIC by Walther is used in calculators to perform trigonometric functions, inverse trigonometric functions, hyperbolic functions, and the like. CORDIC is an iterative approach, using additions and shifts to give an added bit of precision with each iteration. Thus, for 16-bit precision, 16 iterations are required. An example CORDIC calculation is given in an Appendix attached hereto and forming a part hereof.

The described prior art approaches either use large amounts of memory or are computationally intensive.

SUMMARY OF THE INVENTION

The invention provides a method and apparatus for accurately finding the phase of a complex number using low computational complexity, without the requirement for a large lookup table.

The invention uses a hybrid two-step process to find the argument $\theta$ of an n-bit complex number I+jQ. The first step utilizes a limited lookup to get a rough angle $\theta$~ from the approximation I~+jQ~ of the number, using the first m (m<n) bits of the number. The second step finds the remaining angle correction $\Delta\theta$ through a rotation obtained by multiplying the number I+jQ by the conjugate of the approximation I~+jQ~, to get the complete angle of I+jQ. The second step assumes that arctan $\Delta\theta = \Delta\theta$ (where $\Delta\theta$ is the difference phase angle with the real axis) for small values of $\Delta\theta$.

The inventive approach gives improved performance over the CORDIC approach, using a slightly larger lookup table but lower computational complexity. For example, CORDIC uses a 16-word table for 16-bit accuracy; whereas, the inventive approach uses a 100-word table (plus an additional 256 words, if a second lookup table is used instead of division).

DETAILED DESCRIPTION OF PREFERRED EMBODIMENTS

Figure 1:
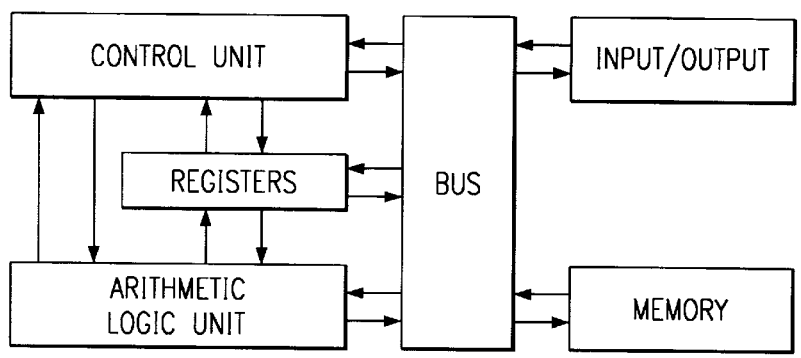
FIG. 1 is a block diagram of apparatus for computing complex phase.
Figure 2A:
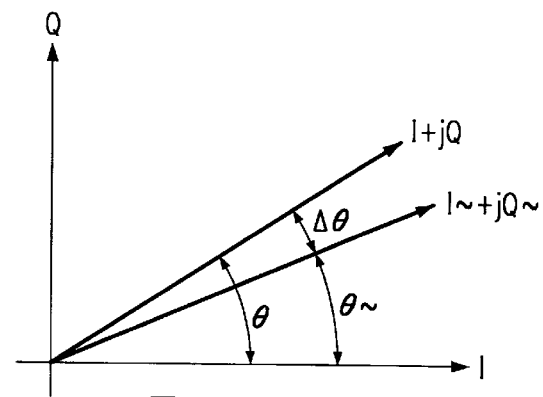
FIGS. 2A and 2B are representations of the complex number and rotated complex number vectors helpful in understanding the method of the invention.
Figure 2B:
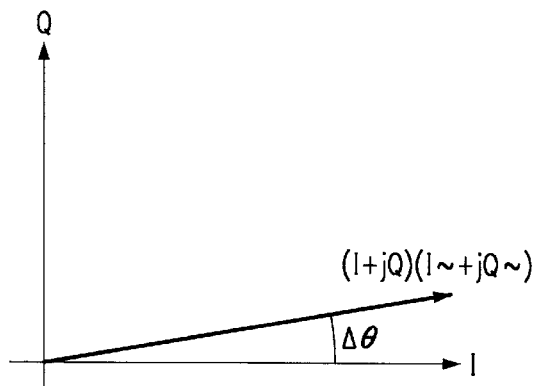

FIG. 1 shows apparatus for computing the phase of a complex number I+jQ, where I represents the real part and Q the imaginary part. The complex number may come from an input port or may be the result of some other computation.

The angle function can be calculated by mapping all the complex points into the sector from 0 to 45 degrees. There are eight cases in this mapping:

$$x \geq 0, y \geq 0, |x| \geq |y| \rightarrow \text{angle} = \text{angle}(|x| + j|y|)$$
$$, |x| < |y| \rightarrow \text{angle} = pi/2 - \text{angle}(|y| + j|x|)$$
$$x \geq 0, y < 0, |x| \geq |y| \rightarrow \text{angle} = -\text{angle}(|x| + j|y|)$$
$$, |x| < |y| \rightarrow \text{angle} = -pi/2 + \text{angle}(|y| + j|x|)$$
$$x < 0, y \geq 0, |x| \geq |y| \rightarrow \text{angle} = pi - \text{angle}(|x| + j|y|)$$
$$, |x| < |y| \rightarrow \text{angle} = pi/2 + \text{angle}(|y| + j|x|)$$
$$x < 0, y < 0, |x| \geq |y| \rightarrow \text{angle} = -pi + \text{angle}(|x| + j|y|)$$
$$, |x| < |y| \rightarrow \text{angle} = -pi - \text{angle}(|y| + j|x|)$$

This reduces the problem to the computation of arctan (Q/I), where I>0, Q>0 and I>=Q.

After the preliminary mapping, the next step is to find a rough value of phase $\theta$ from arctan (Q/I) using a lookup table. Then, a correction is applied to determine the final value of the phase.

A lookup table is stored in memory which contains precomputed arctangents for several values of Q and I. In the preferred embodiment, the lookup table uses four bits for I and four bits for Q. Because the interest is in Q/I, both Q and I can be bit-shifted left until the most significant bit in I is equal to 1. Then I and Q can be rounded to four bits to produce the quantized values of a first approximation I~ and Q~, respectively. The range for I~ will be from 8 to 15 and Q~ will be less than or equal to I~, for a total of 100 entries in the lookup table. More entries can be used if greater accuracy is desired; fewer can be used for a smaller lookup table. The lookup table gives the angle $\theta$~ for the vector (I~, Q~). At this point, there will still be significant quantization error, but interpolation can be used to obtain very accurate results.

Interpolation is accomplished using the principle that arctan $\Delta\theta = \Delta\theta$ is an accurate approximation for very small angles of $\Delta\theta$. The point (I,Q) is rotated by the angle $\theta$~ of the rough point (I~, Q~) determined from the lookup table, to give a resultant vector whose angle $\Delta\theta$ is small (less than +/−4 degrees). The rotation is performed using the complex multiplication (I+jQ)*(I~−jQ~) which involves low computational complexity when done by a DSP. The angle Δθ of the resultant vector is then determined by the imaginary part divided by the real part. Thus, the correction term can be calculated by:

$$C=(I\sim*Q-Q\sim*I)/(I*I\sim+Q*Q\sim).$$

This correction term is then added to the value obtained from the lookup table to get the final arctangent calculation.

EXAMPLE

By way of illustration, the angle of 8.214+j3.428 is calculated using the inventive method. In the first step, since (I, Q)=(8.214, 3.428), the rough value for the lookup (I~, Q~)=(8, 3). From the lookup table, arctan (3/8)=0.35877. This is then used for rotation to develop a small resultant vector angle, with a correction term of:

$$C=(8*3.248-3*8.214)/(8.214*8+3.428*3)=0.03661.$$

The final calculation adds the correction term to the rough approximation to get:

$$0.35877+0.03661=0.39538,$$

which is very close to the correct answer 0.39536.

Thus, the method of the invention gives accurate results with very little computation. The method requires only one small table lookup, one complex multiplication, one real division and several additions. Ignoring all quantization except for the 4-bit quantizations for the lookup table, the maximum error is less than 0.005 degrees. Quantization in the value contained in the lookup table and quantization in the complex multiplication and real division will increase the error slightly to about 0.01 degrees.

Figure 3:
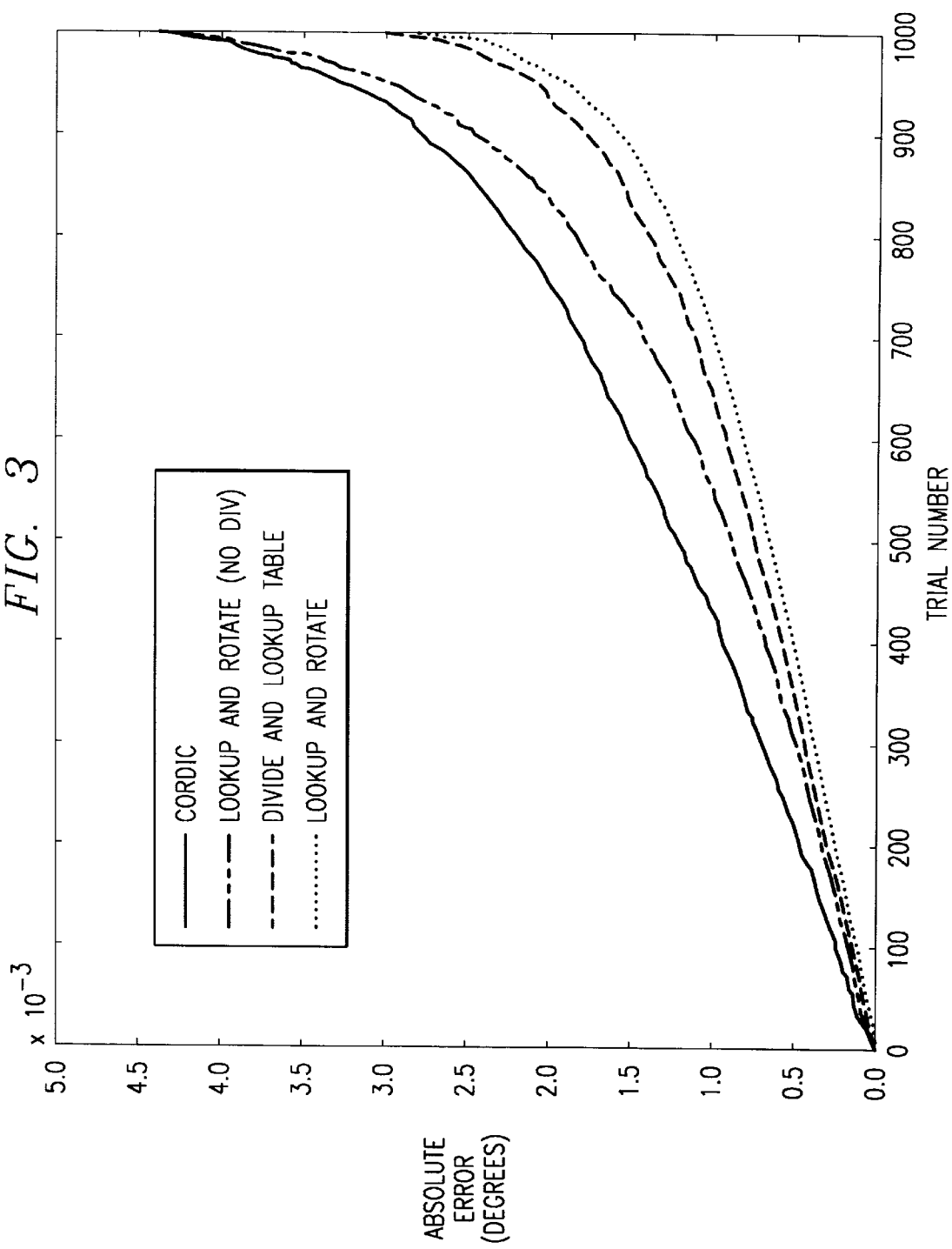
FIG. 3 shows a comparison between the inventive and prior art approaches.

The results of a simulation comparison between CORDIC and the inventive approach are given in FIG. 3. Absolute error given in $10^{-3}$ degrees is plotted on the vertical axis. The horizontal axis is about 1000 tries in sorted numbers. All use 16-bit data for the I+jQ complex number, so can be done on a DSP such as, for example, a T320C5x available from Texas Instruments Incorporated. The top plot is the CORDIC approach. The next plot uses lookup and rotate, followed by a second lookup instead of division. The two bottom plots use a divide.

In an example carrier frequency tracking embodiment, initial carrier frequency correction can be computed from the finger with the strongest signal. The four received pilot signals (after data modulation removal) in the perch channel in timeslot m can be represented by $r_{1,m}$, $r_{2,m}$, $r_{3,m}$, $r_{4,m}$. The data can be removed by multiplying by 1, −1, j and −j when the transmitted data is 1+j, −1−j, 1−j, and −1+j, respectively. The frequency estimate is given by:

$$\hat{f} = \frac{16000}{2\pi}\text{angle}\left(\sum_{m=1}^{64} r^*_{1,m}r_{2,m} + r^*_{2,m}r_{3,m} + r^*_{3,m}r_{4,m}\right)$$

By coherently summing over 40 ms, the fades can be averaged out. The carrier frequency changes very slowly, allowing a long averaging period. The pull-in range for this approach is 8 kHz, and the standard deviation is about 40 Hz.

After locking onto the carrier frequency, very accurate frequency tracking is needed for phase estimation and achieving coherent demodulation in the steady state. The frequency estimate may be computed by calculating phase differences between symbols separated by one timeslot, as follows:

$$\hat{f} = \frac{1600}{2\pi}\text{angle}\left(\sum_{m=1}^{64} (r_{1,m} + r_{2,m} + r_{3,m} + r_{4,m}) * (r_{1,m+1} + r_{2,m+1} + r_{3,m+1} + r_{4,m+1})\right)$$

The pull-in range of this approach is 800 Hz, and the standard deviation is about 5 Hz. When the tracking function is switched to the data channel, the same approach can be used since the pilot symbols are still spaced apart by one timeslot.

Those skilled in the art to which the invention relates will appreciate that various additions, substitutions and modifications can be made to the described embodiments, without departing from the spirit and scope of the invention.

What is claimed is:

1. A method for computing the phase θ of a complex number I+jQ, where I and Q are n-bit binary numbers, comprising the steps of:

determining an approximate complex number I~+jQ~ from m<n most significant bits of the numbers I and Q;

determining an approximate phase θ through memory table lookup of prestored arctan relationships Q~/I~ for complex numbers I~+jQ~;

determining a correction phase Δθ by calculation of a correction term C=(I~*Q−Q~*I)/(I*I~+Q*Q~) which represents the imaginary part divided by the real part of the complex multiplication of the complex number and the conjugate of the approximate complex number; and adding the approximate phase θ to the correction phase Δθ.

2. The method of claim 1, wherein the phase θ is greater than 45 degrees and wherein the method further comprises mapping the complex points I and Q into the sector from 0 to 45 degrees.

3. The method of claim 1, wherein the correction phase Δθ determining step is performed by calculating the numerator (I~*Q−Q~*I) and denominator (I*I~+Q*Q~) using a digital signal processor, and determining the correction phase Δθ through memory table lookup of prestored arctan relationships of the numerator over denominator.

* * * * *